Aug. 6, 1968    M J. HERZBERGER ET AL    3,395,962
SUPERACHROMATIC OBJECTIVE
Filed May 12, 1965

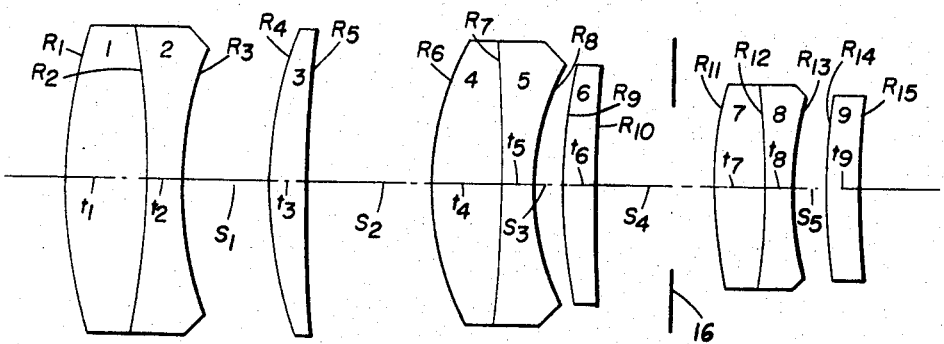

| ELEMENT | $N_1 - N_9$ | $V_1 - V_9$ | $R_1 - R_{15}$ in mm. | $t_1-t_9$ and $S_1-S_5$ in mm. |
|---|---|---|---|---|
| 1 | 1.492 | 70.0 | $R_1 = +\ 59.8$ | $t_1 =\ \ 10.1$ |
|   |       |      | $R_2 = -\ 107.0$ | $t_2 =\ \ \ 4.3$ |
| 2 | 1.645 | 43.9 | $R_3 = +\ 45.5$ |  |
|   |       |      |  | $S_1 =\ \ \ 9.9$ |
| 3 | 1.679 | 41.9 | $R_4 = +\ 50.0$ | $t_3 =\ \ \ 5.8$ |
|   |       |      | $R_5 = +326.0$ | $S_2 =\ \ 13.4$ |
| 4 | 1.492 | 70.0 | $R_6 = +\ 34.9$ | $t_4 =\ \ \ 8.1$ |
|   |       |      | $R_7 = -2760.0$ | $t_5 =\ \ \ 4.0$ |
| 5 | 1.645 | 43.9 | $R_8 = +\ 30.5$ |  |
|   |       |      |  | $S_3 =\ \ \ 3.3$ |
| 6 | 1.679 | 41.9 | $R_9 = +\ 64.7$ | $t_6 =\ \ \ 4.5$ |
|   |       |      | $R_{10} = +440.0$ | $S_4 =\ \ 13.3$ |
| 7 | 1.492 | 70.0 | $R_{11} = +\ 50.3$ | $t_7 =\ \ \ 6.2$ |
|   |       |      | $R_{12} = -\ 122.0$ | $t_8 =\ \ \ 3.1$ |
| 8 | 1.645 | 43.9 | $R_{13} = +\ 44.9$ |  |
|   |       |      |  | $S_5 =\ \ \ 4.1$ |
| 9 | 1.679 | 41.9 | $R_{14} = +\ 83.0$ | $t_9 =\ \ \ 4.0$ |
|   |       |      | $R_{15} = +1090.0$ |  |

FIG. 2

MAX HERZBERGER
NANCY R. MC CLURE
INVENTORS

BY R. Frank Smith
Leonard H. Treash Jr.
ATTORNEYS

United States Patent Office 3,395,962
Patented Aug. 6, 1968

3,395,962
SUPERACHROMATIC OBJECTIVE
Maximilian J. Herzberger, Zurich, Switzerland, and Nancy R. McClure, Rochester, N.Y., assignors to Eastman Kodak Company, Rochester, N.Y., a corporation of New Jersey
Filed May 12, 1965, Ser. No. 455,197
2 Claims. (Cl. 350—215)

ABSTRACT OF THE DISCLOSURE

A photographic objective composed of three triplets, each having an airspace between the second and third elements thereof. Each triplet is individually corrected by choice of glasses for chromatic aberrations at four wavelengths.

---

This invention relates to photographic objectives suitable for use in color printers. More specifically, it relates to photographic objectives which are achromatized for four different wavelengths.

Several years ago, it was found by the applicants that with the right choice of glass a triplet may be achromatized for four different wavelengths of light. Triplets so corrected were named "superachromats." This method of choice of glass and achromatization is described in the following publications:

Herzberger and McClure, "The Design of Superachromatic Lenses," 2, Applied Optics, 553 (June 1963).
Herzberger, "Some Recent Ideas in the Field of Geometrical Optics," 53, J. Opt. Soc. Amer. 661 (June 1963).
Herzberger, "Color Correction in Optical Systems and a New Dispersion Formula," 6 Optica Acta 197 (1959).

As was stated in these publications, applicants have found at least 170 different sets of glasses that allow achromatization for four different wavelengths.

It is an object of this invention to apply these principles to the design of an objective which is not only well-corrected for color but also sufficiently well-corrected for other aberrations, especially spherical aberration and coma, to allow it to be used in a high quality color printer.

The above object is partially accomplished by the choice of three particular glasses described in glass catalogues as FK-5, EKF-497 and BaSF-6. These glasses are arranged in each of three triplets whose bendings are used to correct for spherical aberration and into which an airspace is inserted to aid in the correction of coma. Other aberrations are kept to a minimum by keeping the various radii of curvature within particular limits, which limits will be set out below. Although having three components aids in all corrections, this feature is especially useful in increasing aperture.

Use of the above methods has produced extremely well-corrected objectives of relatively wide apertures which objectives are suitable for the high demands of color printing.

In the drawings:
FIG. 1 is a diagrammatic axial cross section of an objective made according to the invention;
FIG. 2 is a chart of specifications for an objective made according to the invention.

In the drawings and in all other instances herein, from front (long conjugate side) to rear the elements are numbered from 1 to 9, the radii of curvature from $R_1$ to $R_{15}$, the thicknesses from $t_1$ to $t_9$ and the separations from $S_1$ to $S_5$. The indexes of refraction, $N_1$ to $N_9$, are for the F line of the spectrum and $V_1$ to $V_9$ are the dispersive indexes. A stop 16 is placed between the second component and the third component.

The characteristics of the three glasses used and their placement in the objective are set out in the following chart:

| Glass | Elements | V | $N_C$ | $N_D$ | $N_F$ | $N_g$ |
|---|---|---|---|---|---|---|
| FK-5 | 1, 4, 7 | 70.0 | 1.485 | 1.487 | 1.492 | 1.496 |
| EKF-497 | 2, 5, 8 | 43.9 | 1.631 | 1.636 | 1.645 | 1.654 |
| BaSF-6 | 3, 6, 9 | 41.9 | 1.663 | 1.667 | 1.679 | 1.688 | wherein $N_C$, $N_D$, $N_F$ and $N_g$ are the indexes of refraction for the C, D, F and g lines of the spectrum. Reference is made to the publications cited above for the method of using these characteristics in designing a superachromat.

High corrections are obtainable for all aberrations if the various radii, thicknesses and separations are within the following limits, where F is the focal length of the lens:

$$0.65F > R_1 > 0.55F$$
$$1.3F > -R_2 > 0.9F$$
$$0.50F > R_3 > 0.40F$$
$$0.55F > R_4 > 0.45F$$
$$4.0F > R_5 > 2.0F$$
$$0.40F > R_6 > 0.30F$$
$$\infty - R_7 > 10F$$
$$0.35F > R_8 > 0.27F$$
$$0.70F > R_9 > 0.60F$$
$$5.0F > R_{10} > 3.7F$$
$$0.55F > R_{11} > 0.45F$$
$$1.3F > -R_{12} > 1.15F$$
$$.50F > R_{13} > 0.40F$$
$$0.9F > R_{14} > 0.75F$$
$$\infty > R_{15} > 5F$$
$$0.12F > t_1 > 0.08F$$
$$0.05F > t_2 > 0.04F$$
$$0.07F > t_3 > 0.05F$$
$$0.09F > t_4 > 0.07F$$
$$0.05F > t_5 > 0.03F$$
$$0.055F > t_6 > 0.035F$$
$$0.07F > t_7 > 0.05F$$
$$0.04F > t_8 > 0.025F$$
$$0.05F > t_9 > 0.03F$$
$$0.12F > S_1 > 0.08F$$
$$0.16F > S_2 > 0.12F$$
$$0.040F > S_3 > 0.027F$$
$$0.16F > S_4 > 0.12F$$
$$0.047F > S_5 > 0.035F$$

An objective according to the invention may be made according to the following specifications:

[E.F.=100 mm. f/2.8]

| Element | $N_1$-$N_9$ | $V_1$-$V_9$ | $R_1$-$R_{15}$ in mm. | $t_1$-$t_9$, $S_1$-$S_5$ in mm. |
|---|---|---|---|---|
| 1 | 1.492 | 70.0 | $R_1 = +59.8$ | $t_1 = 10.1$ |
|   |       |      | $R_2 = -107$  |               |
| 2 | 1.645 | 43.9 |               | $t_2 = 4.3$   |
|   |       |      | $R_3 = +45.5$ |               |
|   |       |      |               | $S_1 = 9.9$   |
|   |       |      | $R_4 = +50.0$ |               |
| 3 | 1.679 | 41.9 |               | $t_3 = 5.8$   |
|   |       |      | $R_5 = +326$  |               |
|   |       |      |               | $S_2 = 13.4$  |
|   |       |      | $R_6 = +34.9$ |               |
| 4 | 1.492 | 70.0 |               | $t_4 = 8.1$   |
|   |       |      | $R_7 = -2,760$|               |
| 5 | 1.645 | 43.9 |               | $t_5 = 4.0$   |
|   |       |      | $R_8 = +30.5$ |               |
|   |       |      |               | $S_3 = 3.3$   |
|   |       |      | $R_9 = +64.7$ |               |
| 6 | 1.679 | 41.9 |               | $t_6 = 4.5$   |
|   |       |      | $R_{10} = +440$|              |
|   |       |      |               | $S_4 = 13.3$  |
|   |       |      | $R_{11} = +50.3$|             |
| 7 | 1.492 | 70.0 |               | $t_7 = 6.2$   |
|   |       |      | $R_{12} = -122$|              |
| 8 | 1.645 | 43.9 |               | $t_8 = 3.1$   |
|   |       |      | $R_{13} = +44.9$|             |
|   |       |      |               | $S_5 = 4.1$   |
|   |       |      | $R_{14} = +83.0$|             |
| 9 | 1.679 | 41.9 |               | $t_9 = 4.0$   |
|   |       |      | $R_{15} = +1,090$|            |

The lens of the above example has its most accurate focus and highest corrections when the object is placed 289 mm. in front of $R_1$ in which case its image, reduced by a factor of 2.16, will be about 93 mm. to the rear of $R_{15}$. If so used, this lens is superior to all previously known designs for printing a 16 mm. color image from a 35 color object. With only slight changes in relative conjugates the same objective may be used to project for printing an 8 mm. image from a 16 mm. object. Very slight changes in curvature will allow use of this design at other magnifications for other color printing applications. The invention has been described in considerable detail with particular reference to certain preferred embodiments thereof, but it will be understood that variations and modifications can be effected within the spirit and scope of the invention as described hereinbefore and as defined in the appended claims.

We claim:

1. A photographic objective comprising three airspaced triplets, each triplet having from front to rear, an airspace between the second and third elements thereof, each triplet being made from the following glasses having substantially the following characteristics:

| Glass | Elements | V | $N_C$ | $N_D$ | $N_F$ | $N_G$ |
|---|---|---|---|---|---|---|
| FK-5 | 1, 4, 7 | 70.0 | 1.485 | 1.487 | 1.492 | 1.496 |
| EKF-497 | 2, 5, 8 | 43.9 | 1.631 | 1.636 | 1.645 | 1.654 |
| BaSF-6 | 3, 6, 9 | 41.9 | 1.663 | 1.667 | 1.679 | 1.688 | wherein $N_C$, $N_D$, $N_F$, and $N_G$ are the indexes of refraction for the C, D, F and G lines of the spectrum, V is the dispersive index, and the elements are numbered from front to rear from 1 to 9; and wherein the various elements are constructed according to the following table:

[E.F. = 100 mm., f/2.8]

| Element | $R_1$-$R_{15}$ in mm. | $t_1$-$t_9$, $S_1$-$S_5$ in mm. |
|---|---|---|
| 1 | $R_1 = +59.8$ | $t_1 = 10.1$ |
|   | $R_2 = -107$ |  |
| 2 |  | $t_2 = 4.3$ |
|   | $R_3 = +45.5$ |  |
|   |  | $S_1 = 9.9$ |
| 3 | $R_4 = +50.0$ | $t_3 = 5.8$ |
|   | $R_5 = +326$ |  |
|   |  | $S_2 = 13.4$ |
| 4 | $R_6 = +34.9$ | $t_4 = 8.1$ |
|   | $R_7 = -2,760$ |  |
| 5 |  | $t_5 = 4.0$ |
|   | $R_8 = +30.5$ |  |
|   |  | $S_3 = 3.3$ |
| 6 | $R_9 = +64.7$ | $t_6 = 4.5$ |
|   | $R_{10} = +440$ |  |
|   |  | $S_4 = 13.3$ |
| 7 | $R_{11} = +50.3$ | $t_7 = 6.2$ |
|   | $R_{12} = -122$ |  |
| 8 |  | $t_8 = 3.1$ |
|   | $R_{13} = +44.9$ |  |
|   |  | $S_5 = 4.1$ |
| 9 | $R_{14} = +83.0$ | $t_9 = 4.0$ |
|   | $R_{15} = +1,090$ |  | wherein, from front to rear, the radii are numbered from $R_1$ to $R_{15}$, the thicknesses from $t_1$ to $t_9$, and the separations from $S_1$ to $S_5$.

2. A photographic objective having an equivalent focal length of 100 comprising in spaced optical alignment three triplets, each of which has an airspace between the second and third element and each of which is chromatically corrected for four colors, wherein the elements have substantially the following characteristics and spacial relations, in which the lens elements are numbered from front to rear, $N_F$ is the index of refraction for the F line of the spectrum, and R, $t$ and S refer respectively to the radii of curvature of the lens surfaces, the axial thicknesses of the lens elements and the axial spacings between the lens elements, numbered by subscript from front to rear:

| Element | $N_F$ | R | $t$ and S |
|---|---|---|---|
| 1 | 1.49 | $R_1 = +60$ | $t_1 = 10.1$ |
|   |  | $R_2 = -107$ |  |
| 2 | 1.65 |  | $t_2 = 4.3$ |
|   |  | $R_3 = +46$ |  |
|   |  |  | $S_1 = 9.9$ |
| 3 | 1.68 | $R_4 = +50$ | $t_3 = 5.8$ |
|   |  | $R_5 = +326$ |  |
|   |  |  | $S_2 = 13.4$ |
| 4 | 1.49 | $R_6 = +35$ | $t_4 = 8.1$ |
|   |  | $R_7 = -2,760$ |  |
| 5 | 1.65 |  | $t_5 = 4.0$ |
|   |  | $R_8 = +31$ |  |
|   |  |  | $S_3 = 3.3$ |
| 6 | 1.68 | $R_9 = +65$ | $t_6 = 4.5$ |
|   |  | $R_{10} = +440$ |  |
|   |  |  | $S_4 = 13.3$ |
| 7 | 1.49 | $R_{11} = +50$ | $t_7 = 6.2$ |
|   |  | $R_{12} = -122$ |  |
| 8 | 1.65 |  | $t_8 = 3.1$ |
|   |  | $R_{13} = +45$ |  |
|   |  |  | $S_5 = 4.1$ |
| 9 | 1.68 | $R_{14} = +83$ | $t_9 = 4.0$ |
|   |  | $R_{15} = +1,090$ |  |

References Cited

Herzberger, et al., Applied Optics, vol. 2, No. 6, June 1963, pp. 553–560 (copy in 350—215).

DAVID SCHONBERG, *Primary Examiner.*

R. J. STERN, *Assistant Examiner.*